Figure 1:
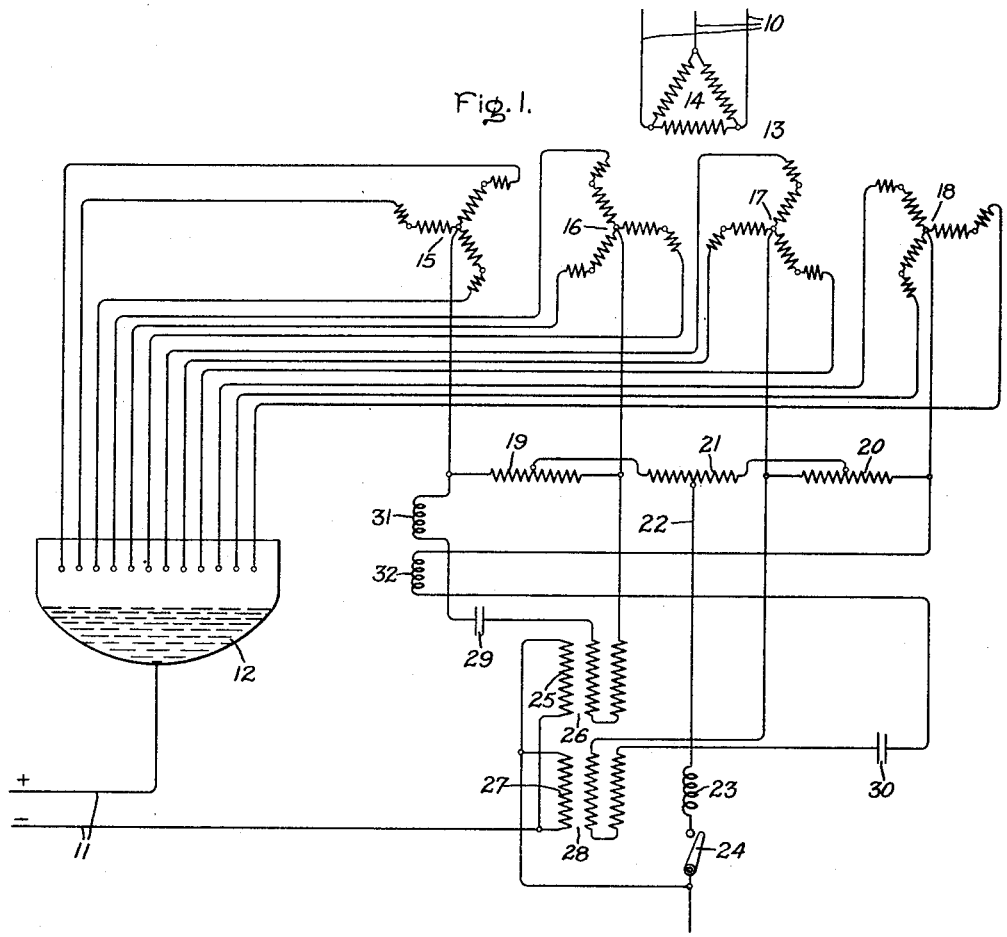

April 19, 1932.   T. C. LENNOX   1,854,945
RECTIFYING SYSTEM
Filed Jan. 9, 1930

Inventor:
Thomas C. Lennox,
by Charles E. Tullar
His Attorney.

Patented Apr. 19, 1932

1,854,945

UNITED STATES PATENT OFFICE

THOMAS C. LENNOX, OF PITTSFIELD, MASSACHUSETTS, ASSIGNOR TO GENERAL ELECTRIC COMPANY, A CORPORATION OF NEW YORK

RECTIFYING SYSTEM

Application filed January 9, 1930. Serial No. 419,656.

My invention relates to electric systems wherein power is interchanged between direct and alternating current circuits through means comprising an electric discharge apparatus, such as a mercury rectifier, and has for its principal object the provision of an improved arrangement and method of operation whereby the voltage of the direct current circuit may be maintained substantially independent of variation in the magnitude of the direct current load or may be made to increase or decrease as this load increases.

In my copending application Serial No. 347,399, filed March 15, 1929, and assigned to the same assignee as the present application, is disclosed a rectifying apparatus wherein voltage regulation of the direct current circuit is effected by means of an interphase connection including predetermined inductive and capacitive impedances so arranged as to produce an effective impedance which varies inversely as a direct current load. This interphase connection may include a reactor, an auxiliary transformer and a condenser arranged to produce such variation in the impedance of the transformer connection that the output voltage of the rectifier will rise as the direct current load increases, the extent of this rise and the degree of compounding being determined by the constants of the interphase circuit connections.

It is sometimes desirable to utilize the above interphase connection to regulate the voltage of 12 phase rectifiers or the like. As is well understood by those skilled in the art, a 12 phase rectifying system may be made up of two 6 phase systems, each of which includes an interphase transformer, a reactor and a condenser. In the application of the above invention to such systems, difficulty has been encountered due to the fact that the reactive voltage of the main transformer tends to cause unequal distribution of the load between the two interphase connections, one of the interphase connections being subjected to the largest load when the phase rotation of the main transformer is in one direction and the other interphase connection having the largest load when the phase rotation of the main transformer is in the opposite direction.

In accordance with my invention this difficulty is minimized or altogether obviated by the provision of an interconnection between the different interphase connections, whereby the effect of the reactive voltage generated in the main transformer windings is neutralized.

My invention will be better understood from the following description when considered in connection with the accompanying drawings, and its scope will be pointed out in the appended claims.

Figure 2:
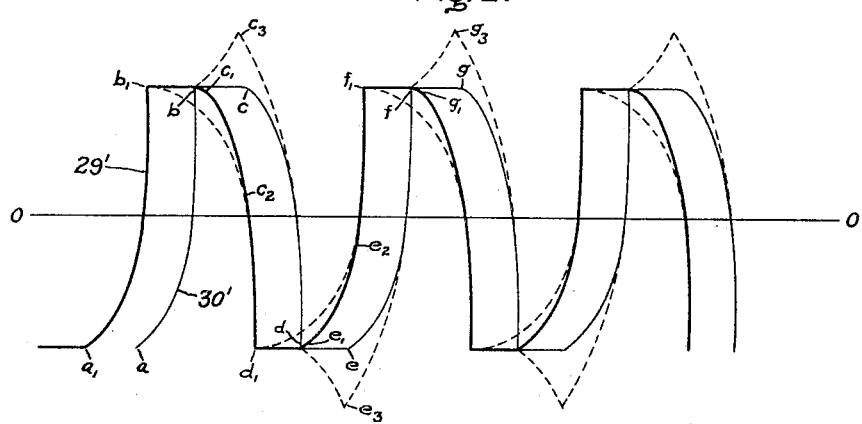

Referring to the drawings, Fig. 1 illustrates a rectifying system wherein my invention has been embodied; and Fig. 2 is an explanatory diagram relating to the operation of this system. This system includes alternating current supply terminals 10, direct current terminals 11 between which electric power is transmitted through a rectifier 12 and a main transformer 13. The transformer 13 is provided with a delta connected primary winding 14 and with four star connected secondary windings 15, 16, 17 and 18. The star connected secondary windings 15 and 16 are arranged to have their neutral terminals interconnected through an interphase transformer 19 and the star connected secondary windings 17 and 18 are likewise arranged to have their neutral terminals interconnected through an interphase transformer 20. Connected between the interphase transformers 19 and 20 is a winding 21 provided with a mid-terminal 22 which is connected to the negative side of the direct current circuit through a smoothing reactor 23, a switch 24, the winding 25 of a reactor 26, and the winding 27 of a reactor 28.

The transformer windings 15 and 16 form in effect a 6 phase system. The interphase connection of this system includes the interphase transformer 19, the reactor 26 and a condenser 29. The interphase connection of the 6 phase system formed by the windings 17 and 18 includes the interphase transformer 20, a condenser 30 and the reactor 28.

As previously explained, the effect of the reactive voltage in the main transformers is to cause the 6 phase system including the windings 15 and 16, to take more load than the 6 phase system including the windings 17 and 18 when the phase rotation of the transformer 13 is in one direction and to cause the 6 phase system including the windings 17 and 18 to take more load than the 6 phase system including the windings 15 and 16 when the phase rotation of the transformer 13 is in the opposite direction. This result is avoided by the provision of windings 31 and 32 which are inductively related with one another and are each connected in a different interphase connection.

The two 6 phase systems are so arranged as to be 30 electrical degrees out of phase with each other and thus produce 12 phase operation of the rectifier 12.

In order to produce 12 phase operation of the rectifier 12, the two 6 phase systems are arranged to be 30 electrical degrees out of phase with each other. When the rectifier is in operation the currents in the circuits of the condensers 29 and 30 include two triple frequency alternating currents which are in quadrature with one another. These two currents are indicated in Fig. 2 by the curve 29' which indicates the triple frequency current transmitter through the interphase connection including the condenser 29 and a curve 30' which represents the triple frequency current transmitted through the interphase system including the condenser 30.

Due to the fact that the secondary windings 15, 16, 17 and 18 are very closely interlaced and the reactive voltage generated in one of these windings is effective in the other, one of the 6 phase systems is subjected to a larger load than the other. In Fig. 2 the portions $a, b, c, d, e, f, g$ of the curve 30' represent the current in the interphase connection including the condenser 30 and the parts $a_1, b_1, c_1, d_1, e_1, f_1$ of curve 29' represent the triple frequency currents in the interphase connection including the condenser 29'. It will be observed that when the interphase system including the condenser 30 commutates from $c$ to $d$, the reactive voltage in the main transformer which opposes the change will be effective in the direction $d$—$c$, and as it will also act on the system including the condenser 29, it will tend to make the current of that system change in the same direction, consequently causing the current to take the form $d_1, e_2$ instead of $d_1, e_1$. This will be repeated every half cycle in the interphase current as indicated by the curves in Fig. 2.

When commutation occurs in the system including the condenser 29 as on $c_1$ and $d_1$, the reactive voltage in the main transformer is effective in the direction $d_1$—$c_1$ and will consequently cause the current in the system, including the condenser 30, to assume the form indicated between $b$ and $c_8$. This will be repeated every half cycle as indicated in Fig. 2.

The net result of this condition is that the system including the condenser 30 takes more than one-half the total load on the rectifier, the 12 phase operation of the rectifier is disturbed and the equipment is not utilized economically. If the phase rotation of the 3 phase current supplied to the primary winding 14 of the main transformer is reversed, this condition is changed so that the system including the condenser 29 will take the larger current and the system including the condenser 30 the smaller.

In order to insure an equal distribution of the load between the two 6 phase systems, the coils 31 and 32 are provided. These two coils are connected in the different interphase connections as previously explained, and may be wound on a common core or may be suitably interlaced if a core is not used. In either case they are so designed that the voltages generated in them have opposite polarity and function to eliminate the effect of the reactive voltage generated in the main transformer windings. If these coils are so designed that their voltage is equal or equivalent to the reactive voltage of the main transformer windings, they will have an exactly equal and opposite effect so that the load will be equally divided between the two 6 phase systems.

It will be apparent that the coils 31 and 32 may be connected at the neutral connections between the main transformer secondary windings and the interphase transformers. The advantage of so connecting these coils is that the exciting currents for the interphase transformers will be transmitted through them. The disadvantage is that the reactor will have to be made larger in order to carry the direct current in addition to the alternating current.

While I have shown and described my invention with reference to an electric discharge apparatus of the vapor electric type and in which all of the anodes are enclosed in a single vessel it will be understood that I do not wish to be limited thereto, since any other suitable arangement of electric discharge apparatus in which current is caused to flow unidirectionally between a negative conductor and a plurality of anodes, for rectifying or like puprposes, may be employed. Thus while I have shown only a single embodiment of my invention it will be understood that many modifications may be made therein and that I contemplate by the appended claims to cover any such modification as falls within the true spirit and scope of my invention.

What I claim as new and desire to secure by Letters Patent of the United States is:

1. The combination of two polyphase systems each provided with main transformer windings and with an interphase connection between the neutral terminals of said windings, an electric discharge apparatus, direct current terminals connected directly to said interphase connection and through said apparatus to said windings, and means interposed between said interphase connections for neutralizing an effect of the reactive voltage of said windings.

2. The combination of two polyphase systems each provided with main transformer windings and with an interphase connection between the neutral terminals of said windings, an electric discharge apparatus, direct current terminals connected directly to said interphase connection and through said apparatus to said windings, and impedance means including coils inductively related with one another and interposed in different interphase connections for equalizing the loads of said polyphase systems.

3. The combination of two polyphase systems each provided with main transformer windings and with an interphase connection including a condenser connected between the neutral terminals of said windings, an electric discharge apparatus, direct current terminals connected directly to said interphase connection and through said apparatus to said windings, and means interposed between said interphase connections for neutralizing an effect of the reactive voltage of said windings.

4. The combination of two polyphase systems each provided with main transformer windings and with an interphase connection including a reactor connected between the neutral terminals of said windings, an electric discharge apparatus, direct current terminals connected directly to the said interphase connection and through said apparatus to said windings, and means interposed between said interphase connections for neutralizing an effect of the reactive voltage of said windings.

5. The combination of two polyphase systems each provided with main transformer windings and with an interphase connection including a condenser and a reactor connected between the neutral terminals of said windings, an electric discharge apparatus, direct current terminals connected directly to said interphase connection and through said apparatus to said windings, and means interposed between said interphase connections for neutralizing an effect of the reactive voltage of said windings.

6. The combination of two 6-phase systems each provided with two 3-phase main transformer windings and with an interphase connection including a reactor connected between the neutral terminals of said windings, an electric discharge apparatus, direct current terminals connected directly to the said interphase connection and through said apparatus to said windings, and means interposed between said interphase connections for neutralizing an effect of the reactive voltage of said windings.

7. The combination of two 6-phase systems each provided with two 3-phase main transformer windings and with an interphase connection including a condenser and a reactor connected between the neutral terminals of said windings, an electric discharge apparatus, direct current terminals connected directly to said interphase connection and through said apparatus to said windings, and means interposed between said interphase connections for neutralizing an effect of the reactive voltage of said windings.

In witness whereof, I have hereunto set my hand this 6th day of Jan., 1930.

THOMAS C. LENNOX.